United States Patent [19]

Cox

[11] 4,306,733
[45] Dec. 22, 1981

[54] RAPID ASSEMBLY BICYCLE BUGGY

[76] Inventor: William E. Cox, 6321 Petain, Dallas, Tex. 75227

[21] Appl. No.: 111,800

[22] Filed: Jan. 14, 1980

[51] Int. Cl.³ ............................................ B62K 27/10
[52] U.S. Cl. ..................................... 280/204; 280/656
[58] Field of Search ............... 280/292, 204, 494, 656, 280/47.26

[56] References Cited

U.S. PATENT DOCUMENTS

| | | | |
|---|---|---|---|
| 559,761 | 5/1896 | Trancle-Armand | 280/204 |
| 947,945 | 2/1910 | Sampson | 280/204 |
| 2,343,019 | 2/1944 | Neal | 280/204 |
| 2,517,162 | 8/1950 | Arman | 280/204 |
| 3,271,048 | 9/1966 | Beesley et al. | 280/204 |
| 3,747,955 | 7/1973 | MacAlpine | 280/204 |
| 3,909,042 | 9/1975 | Miller | 280/204 |
| 4,027,899 | 6/1977 | Hawer et al. | 280/204 X |
| 4,077,646 | 3/1978 | Watkins | 280/204 |

Primary Examiner—John P. Silverstrim
Attorney, Agent, or Firm—Richards, Harris & Medlock

[57] ABSTRACT

A bicycle (10) includes a frame (14), wheels (16) and cushions (18,20,22,24,26). The buggy (10) is connected by means of a tow bar (30) to a seat stud (28) of a bicycle (12). The buggy frame (14) can be disassembled into various components including side frames (36,38), a back bar (52), cross bars (82,84,86,88) and a foot support (90). The buggy is supported by wheels (16) and is drawn by the tow bar (30) which is connected to the bicycle (12) by means of a scissor latch (112).

16 Claims, 5 Drawing Figures

RAPID ASSEMBLY BICYCLE BUGGY

TECHNICAL FIELD

The present invention pertains generally to bicycle transportation, and in particular, to a two-wheel buggy which is towed behind a bicycle.

BACKGROUND OF THE INVENTION

Bicycle transportation has been popular for many years and has recently undergone a resurgence of interest due to the high cost of energy and the interest in nonpolluting outdoor recreation. Bicycle outings frequently include groups of people, usually families, and many small children are not capable of independently operating a bicycle. Also, many people prefer to ride and enjoy the trip without the effort required to propel the bicycle. For these reasons, a number of accessories have been developed to permit a bicycle to provide transportation for more than one person. In particular, a number of various styles of bicycle buggies have been developed in which the buggy is towed behind a conventional bicycle so that one or two persons or several small children can be carried in the buggy. Various types of such bicycle buggies are shown in U.S. Pat. Nos. 559,761 to Trande-Armand; 947,945 to Sampson; 2,343,019 to Neal; 2,517,162 to Armani; 3,271,048 to Beesley et al; 4,077,646 to Watkins and 3,747,955 to MacAlpine.

Although several different styles of bicycle buggies have been designed as shown by the above patents, the bicycle buggies heretofore in existence are not readily compatible with the experiences of the current time. In many instances, it is not possible to utilize a bicycle or buggy in a local neighborhood due to pollution and automobile traffic. For many people, it is most desirable to engage in a bicycle outing at a park or rural setting some distance from their homes. In these instances, the bicycle buggy must be transported by automobile to the selected location. The bicycle buggies heretofore available are not readily amenable to such transportation since they are generally quite bulky.

A conventional bicycle buggy further is difficult to store when not in use due to its bulk. A bicycle is generally easy to store since it is quite narrow, but the buggy occupies a substantial volume and such storage space is at a premium for many people.

Therefore, there exists a need for a bicycle buggy which can be rapidly assembled, disassembled and stored in a very small volume of space when not in use. In the disassembled condition, the buggy needs to occupy a small area, on the order of that of a bicycle, and must be adaptable for transportation by means of a passenger automobile.

DISCLOSURE OF THE INVENTION

The present invention comprises a rapid assembly and disassembly bicycle buggy which can be stored in a small volume of space. The bicycle buggy includes a pair of side frames each comprising an integral unit having a tubular side bar formed as a copolanar structure having an upward extending back section, a horizontal seat section and an upwardly opening U-shaped section positioned forward and downward from the seat section, each of said side frames further including a wheel fork extending downwardly from the back section. The side frame further includes an arm rest extending from the back section to the seat section, and further includes a plurality of studs extending inwardly from said side bar and positioned normal to the plane of the side frame. The bicycle buggy also has a tubular transverse back bar having the ends thereof adapted to mate with the upper ends of the back sections to join together the side frames. A plurality of tubular cross bars are adapted to engage opposing ones of the studs extending inwardly from the side frames. Means are provided for locking at least one of the cross bars to the studs engaged thereto. A foot support is provided at the lower portion of the U-shaped section and extends therebetween. A V-shaped tow bar is provided and has the end portions thereof adapted to engage the upward extending forward legs of the U-shaped sections. Means are provided for connecting the tow bar to a bicycle for pulling the buggy. A seat cushion is included and is supported by one or more of the cross bars while a back cushion is connected to the transverse back bar. A pair of wheels with quick-release nuts is provided for connection to the lower ends of each of the forks for supporting the bicycle buggy.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
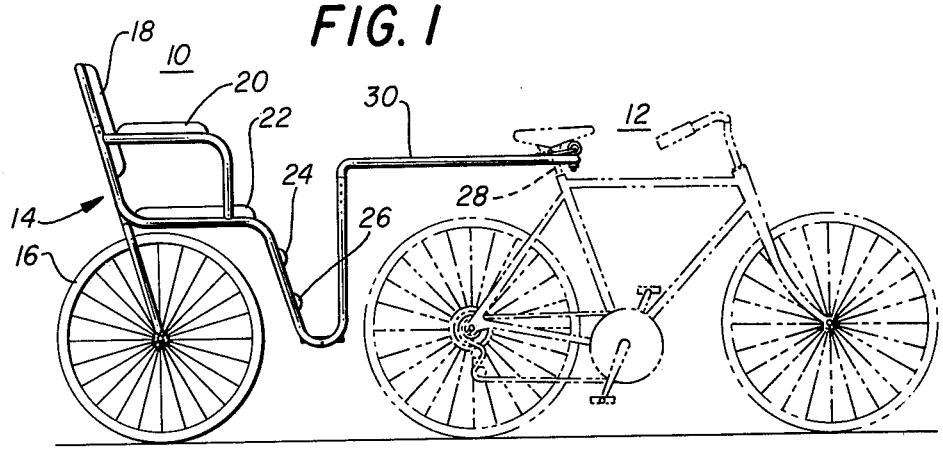
FIG. 1 is an elevation view of a bicycle buggy in accordance with the present invention together with a bicycle connected to tow the buggy.

Referring now to FIG. 1, a bicycle buggy 10 is towed by a multi-speed bicycle 12. The buggy 10 comprises a frame 14 supported by wheels 16. The frame 14 is provided with various padding including a back cushion 18, arm cushions 20 and a seat cushion 22. The frame is further provided with leg cushions 24 and 26.

Buggy 10 is connected to the seat stud 28 of bicycle 12 by means of a tow bar 30.

The bicycle buggy 10 is connected by a pivoting connection from the tow bar 30 to the stud 28 so that the bicycle 12 can pull the buggy 10. Buggy 10 is designed such that it can accommodate two adults or several small children. As described below, buggy 10 can readily be disassembled for storage or transportation by means of an automobile. At the location of usage, the buggy 10 can be readily reassembled without the need for any hand tools.

Figure 2:
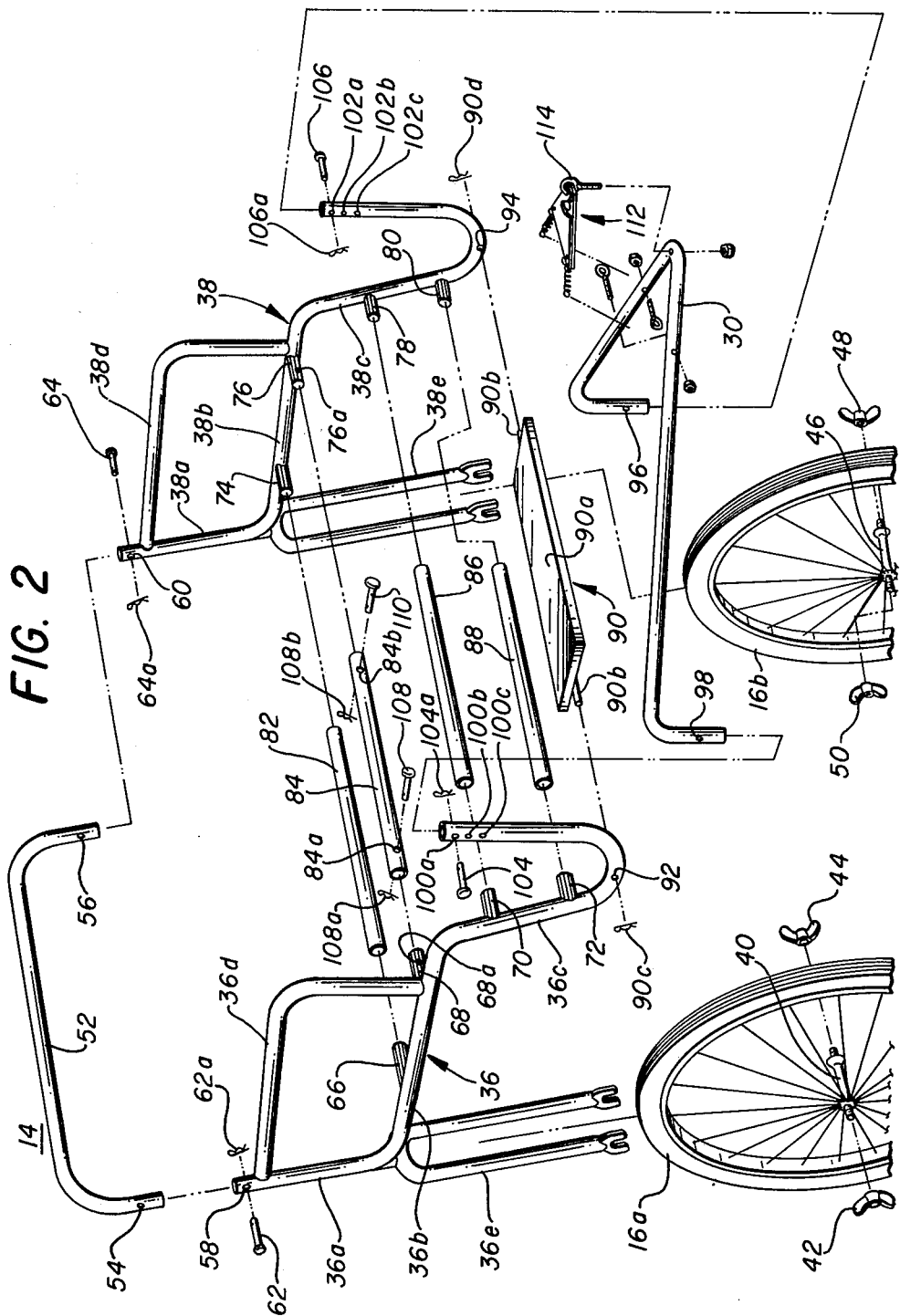
FIG. 2 is an exploded perspective view of the frame of the bicycle buggy shown in FIG. 1.

Referring to FIG. 2, there is illustrated an exploded perspective view of the frame 14 of bicycle buggy 10. Frame 14 includes a pair of side frames 36 and 38. Side frame 36 has an upward extending back section 36a which is connected at its lower end to a horizontal seat section 36b which is joined at its frontmost portion to an upward opening U-shaped section 36c. Side frame 36 further includes an arm rest section 36d which extends from the back section 36a to the seat section 36b and has a curved right angle at the forward end thereof. In a similar fashion, side frame 38 has a back section 38a, a seat section 38b, an upward opening U-shaped section 38c and an arm rest 38d.

In a preferred embodiment the sections 36a, 36b and 36c, corresponding to 38a, 38b and 38c, comprise an integral tubular section which is bent to form the various sections. The arm rests, 36d and 38d, each comprise a single section of tubular material which is bent with a right angle and welded to the back and seat sections of side frames 36 and 38.

Side frame 36 is further provided with a downward extending fork 36e which is aligned parallel with the back section 36a and is welded to the side frame 36. Likewise, side frame 38 is provided with fork 38e which extends downward from back section 38a and is welded to side frame 38. The forks 36e and 38e are provided to be connected to wheels 16a and 16b which support the buggy.

Wheel 16a is provided with an axle 40 and quick disconnect wing nuts 42 and 44 which allow the wheel to be quickly mounted and dismounted on fork 36e. The wheel 16b is also provided with an axle 46 and wing nuts 48 and 50.

The side frames 36 and 38 are interconnected by a plurality of members. A transverse back bar 52 is formed in a U-shape so that the end portions thereof engage the open ends of back sections 36a and 38a. The ends of back bar 52 are tapered so that they extend downward into the back sections. Holes 54 and 56 are formed in the ends of back bar 52. Corresponding holes 58 and 60 are formed in the top portion of back sections 36a and 38a. When back bar 52 is installed to engage back sections 36a and 38a, the units are locked together by means of lock pins 62 and 64 which respectively engage holes 54 and 58 along with holes 56 and 60. Pins 62 and 64 are latched in position by means of clips 62a and 64a.

A plurality of studs 66, 68, 70 and 72 are mounted on the inside of side frame 36 and are positioned to be normal to side frame 36. A corresponding set of studs 74, 76, 78 and 80 are joined to side frame 38 and positioned to extend inward and align respectively with studs 66–72.

A plurality of cross bars 82, 84, 86 and 88 are adapted to receive studs 66–80. In particular, cross bar 82 receives at the ends thereof studs 66 and 74, cross bar 84 receives studs 68 and 76, cross bar 86 receives studs 70 and 78 and cross bar 88 receives studs 72 and 80.

A foot support 90 includes a plate 90a, a rod 90b together with clips 90c and 90d. A lower portion of U-shaped section 36c is provided with a hole 92 while section 38c is provided with a hole 94. The rod 90b is joined to plate 90a and is positioned such that rod 90b extends through holes 92 and 94. Clips 90c and 90d are connected through holes in the ends of rod 90b to secure foot support 90 to the lower ends of sections 36c and 38c.

The two bar 30 is designed in the shape of a V with the end portions turned downward at a 90° angle. The downturned ends of tow bar 30 are dimensioned so that they can be received within the upward extending forward legs of sections 36c and 38c. The ends of tow bar 30 are each provided with holes 96 and 98. The upper free end of section 36c is provided with holes 100a–c and section 38c is provided with holes 102a–c. A pin 104 is provided for engagement with any one of holes 100a–c and hole 98 and to be secured with a clip 104a.

Likewise, a pin 106 is adapted to engage of holes 102a–c together with hole 96 and be secured with pin 106a. By adjusting the alignment of the holes 96 and 98 in tow bar 30 with the selected holes in sections 36c and 38c, it is possible to adjust the height of the tow bar 30 relative the frame 14. This permits the bicycle buggy 10 to be used with different sizes of bicycles 12 having the seat stud 28 set at different elevations.

Cross bar 84 is provided with holes 84a and 84b in the ends thereof. A hole 68a is provided in stud 68 to correspond to hole 84a. Likewise, a hole 76a is provided in stud 76 to correspond to hole 84b. A pin 108 connects cross bar 84 to stud 68 by extending through holes 84a and 68a. Pin 108 is secured by a clip 108a. In a similar fashion, a pin 110 connects cross bar 84 to stud 76 by extending through holes 84b and 76a. Pin 110 is secured by a clip 110a.

Figure 3:
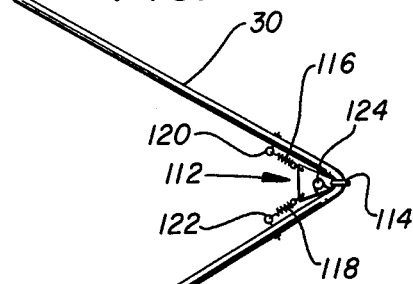
FIG. 3 is a plan view of the tow bar and associated scissor latch.
Figure 5:
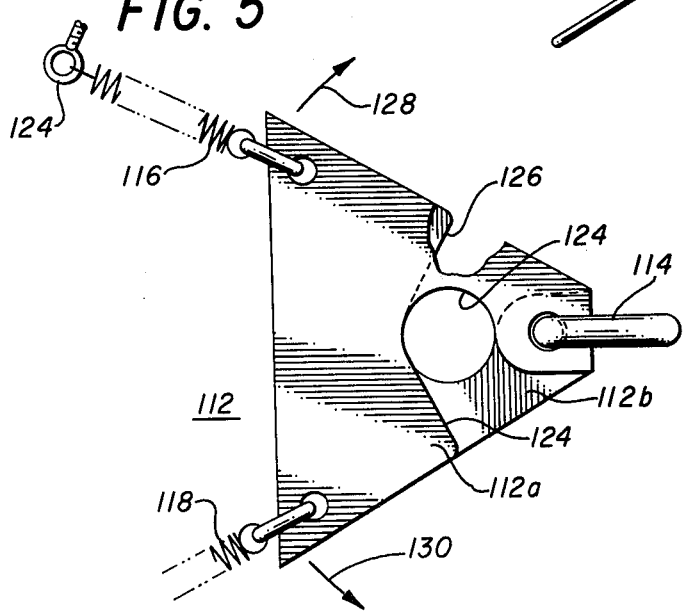
FIG. 5 is a plan view of the scissor latch shown in FIG. 3.

Referring now to FIG. 3, there is shown a plan view of the tow bar 30 together with a scissor latch 112 which is shown in greater detail in FIG. 5. The latch 112 is connected to tow bar 30 at the forwardmost point by means of an eye bolt 114. The latch 112 is triangularly shaped and the rearmost two corners are connected through springs 116 and 118 respectively to eye bolts 120 and 122 which are in turn connected to the two bar 30. The center of latch 112 is provided with an opening 124 through which passes the seat stud 28. The springs 116 and 122 are provided to stabilize the latch 112 so that the buggy 10 may be pulled smoothly by bicycle 12.

Figure 4:
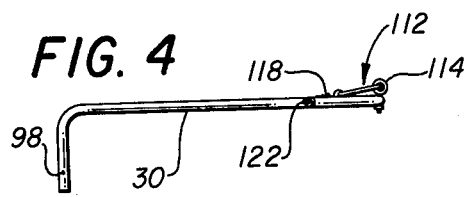
FIG. 4 is an elevation view of the tow bar shown in FIG. 3.

The tow bar 30 is shown in an elevation view in FIG. 4. As can be seen clearly in this view, the latch 112 is supported by eye bolt 114 and tensioned by springs 116 and 118.

The scissor latch 112 is further described in FIG. 5. Latch 112 comprises an upper triangular plate 112a and a lower triangular plate 112b. Plates 112a and 112b are designed to pivot about the eye bolt 114 so as to open and receive the seat stud 28. A hole 124 is formed by a combination of slots in plates 112a and 112b. Plate 112a is provided with a slot 124 which extends inward and rearward from the leading edge of plate 112a. In a similar fashion, plate 112b includes a slot 126 which also extends inward and rearward from the leading edge of plate 112b. The slots are shaped such that the overlapping areas form the hole 124. In the preferred embodiment, hole 124 is approximately one inch in diameter.

In operation, the latch 112 is opened by moving plate 112a in the direction of arrow 128 and plate 112b in the direction of arrow 130. The seat stud 28 is then positioned immediately behind the eye bolt 114 and the plates 112a and 112b are brought back into alignment, which engages stud 28 within hole 124. After engagement, the springs 116 and 118 are connected by means of eye bolts to the rearmost corners of latch 112 while also being connected to eye bolts 120 and 122 that are connected to tow bar 30 along the sides thereof. Latch 112 thus provides a means for quickly attaching and detaching the tow bar 30 to a bicycle by means of connection to the seat stud 28.

The bicycle buggy 10 is disassembled into its component parts as shown in FIGS. 2–5 so that the parts can be stored in a small space. Note that each of the parts is essentially planar and that the parts as a whole can be stored in essentially the same or less space than that of a conventional bicycle. When it is desired to use the bicycle buggy 10 at a remote location, the disassembled parts can be transported by use of a passenger automobile by storage inside or by use of a roof or bumber rack. At the destination, the various parts are unpacked and assembled as shown in FIG. 2. First, the cross bars 82-88 are connected to the corresponding studs on side frames 36 and 38. The lock pins 108 and 110 are inserted through cross bar 84 and studs 68 and 76 to secure the side frames together. Next, the back bar 52 is inserted into the back sections 36a and 38a and engaged by means of pins 62 and 64. In a similar fashion, the foot support 90 is installed on sections 36c and 38c. This completes assembly of frame 14. The wheels 16a and 16b are then installed on forks 36e and 38e by means of the quick release wing nuts 42, 44, 48 and 50. The tow bar 30 is then connected to the bicycle 12 by means of scissor latch 112 by engaging seat stud 28. As the last step, the tow bar 30 is connected to the upstanding ends of sections 36c and 38c and secured thereto by lock pins 104 and 106. The appropriate ones of holes 100a-c and 102a-c and used to fit the buggy 10 to the bicycle 12. After this step, the bicycle buggy is ready for use. As can be seen, the bicycle buggy can be assembled without the use of any tools. Disassembly is accomplished by reversing the above steps.

The present invention provides a bicycle buggy which can be rapidly assembled and disassembled to reduce storage space and enable automobile transportation of the disassembled unit. By means of the various connectors, the unit can be quickly assembled for use without the need for any tools. In a preferred embodiment, the frame 14 and tow bar 30 are manufactured of anodized tubular aluminum which provides a buggy which is lightweight, strong, rust-free and long lasting. Alternatively, the frame and tow bar may be constructed of thin-walled steel tubing or various alloys as currently used in the manufacture of bicycle frames.

Although one embodiment of the invention has been illustrated in the accompanying drawings and described in the foregoing detailed description, it will be understood that the invention is not limited to the embodiment disclosed, but is capable of numerous rearrangements, modifications and substitutions without departing from the scope of the invention.

I claim:

1. A rapid assembly and disassembly bicycle buggy, comprising:
    a pair of side frames each comprising an integral unit having a side bar formed as a coplanar structure having an upward extending back section, a horizontal seat section, an upwardly opening U-shaped section positioned forward and downward from said seat section and an arm rest section extending from said back section to said seat section, each of said side frames further including a wheel fork extending downwardly from said back section and a plurality of studs extending inwardly from said side frames and normal to the plane thereof;
    a transverse back bar having the ends thereof adapted to removably engage the upper ends of said back sections to join together said side frames;
    a plurality of cross bars adapted to removably engage opposing ones of said studs extending inwardly from said side frames;
    a foot support extending between and removably connected to the lower portions of said U-shaped section;
    a V-shaped tow bar having the end portions thereof adapted to removably engage the upward extending forward legs of said U-shaped sections;
    means for removably connecting said tow bar to a bicycle; and
    a pair of wheels each adapted for removable connection to the lower ends of said forks for supporting said buggy.

2. The bicycle buggy recited in claim 1 including a seat cushion supported by one or more of said cross bars and a back cushion supported by said transverse back bar.

3. The bicycle buggy recited in claim 1 including means for locking at least one of said cross bars to the studs positioned for engagement thereto.

4. The bicycle buggy recited in claim 1 wherein two of said studs are connected to said seat section and two of said studs are connected to the inner leg of said U-shaped section.

5. The bicycle buggy recited in claim 1 wherein said back bar is U-shaped and the ends of said back bar are tapered to enter into the upper open ends of said back sections.

6. The bicycle buggy recited in claim 1 wherein the ends of said cross bars are adapted to receive the corresponding studs therein.

7. The bicycle buggy recited in claim 1 wherein said means for connecting comprises a two plate scissor latch having two overlapping triangular plates pivotally connected at the forward end, each plate having an inwardly and a rearwardly directed slot, each slot extending from an opposite side of said latch, said slots having a common opening when said plates are aligned, said opening adapted to receive the seat stud of a bicycle, and said plates connected at the forward ends thereof to said tow bar.

8. The bicycle buggy recited in claim 7 including a pair of springs, one connected to each of the rearward corners of said scissor latch and to said tow bar to hold said scissor latch in position relative to said tow bar.

9. The bicycle buggy recited in claim 1 further including cushions attached to the ones of said cross bars positioned lower than said seat sections.

10. The bicycle buggy recited in claim 1 further including arm cushions attached to each of said arm rests.

11. The bicycle buggy recited in claim 1 wherein said side bars, said back bar, said cross bars and said tow bar are tubular members.

12. The bicycle buggy recited in claim 1 including means for adjusting the height of said tow bar above said U-shaped sections.

13. The bicycle buggy recited in claim 12 wherein said means for adjusting comprises a lock pin which engages one of a plurality of holes in the upper end of each of the forward legs of said U-shaped section and also engages a hole in a downwardly extending end section of said tow bar which enters into said upper end of said forward legs.

14. A rapid assembly and disassembly bicycle buggy, comprising:
    a pair of side frames each comprising an integral coplanar tubular structure having an upward extending back section, a seat section having a first end thereof connected to the lower end of said back section, an arm rest connected between said back section and said seat section, and a forward U-shaped section having one end thereof connected to a second end of said seat section;
    a downwardly extending wheel fork connected to said back section;

a transverse back bar releasably engaged at the ends thereof to said back sections;

a plurality of cross members transversely disposed between said side frames and releasably engaged thereto;

a foot support extending transversely between the lower ends of said U-shaped sections and releasably engaged thereto;

a tow bar releasably connected to the forward legs of said U-shaped sections and releasably connectable at the forward end thereof to a bicycle; and a pair of wheels each adapted for releasable engagement to the lower ends of said forks.

15. The bicycle buggy recited in claim 14 wherein said back sections, said arm rests, said U-shaped sections, said cross members, said back bar and said tow bar are sections of tubular material.

16. The bicycle buggy recited in claim 14 including a seat cushion supported by one or more of said cross bars, a back cushion supported by said back bar and arm cushions supported by said arm rest.

* * * * *

UNITED STATES PATENT AND TRADEMARK OFFICE
CERTIFICATE OF CORRECTION

PATENT NO. : 4,306,733

DATED : December 22, 1981

INVENTOR(S) : William E. Cox

It is certified that error appears in the above-identified patent and that said Letters Patent are hereby corrected as shown below:

Column 2, line 65, change "portion" to --point--.

Column 3, line 59, change "two" to --tow--.

Column 4, line 26, change "two" to --tow--.

Signed and Sealed this

Twenty-seventh Day of July 1982

[SEAL]

Attest:

*Attesting Officer*

GERALD J. MOSSINGHOFF

*Commissioner of Patents and Trademarks*